United States Patent
Trika

(10) Patent No.: US 12,321,609 B2
(45) Date of Patent: Jun. 3, 2025

(54) DATA ROLLBACK FOR TIERED MEMORY AND STORAGE

(71) Applicant: Intel Corporation, Santa Clara, CA (US)

(72) Inventor: Sanjeev Trika, Portland, OR (US)

( * ) Notice: Subject to any disclaimer, the term of this patent is extended or adjusted under 35 U.S.C. 154(b) by 756 days.

(21) Appl. No.: 17/470,275

(22) Filed: Sep. 9, 2021

(65) Prior Publication Data

US 2021/0405889 A1    Dec. 30, 2021

(51) Int. Cl.
*G06F 3/06*      (2006.01)
*G06F 12/02*     (2006.01)
*G06F 12/0891*   (2016.01)

(52) U.S. Cl.
CPC .......... *G06F 3/0619* (2013.01); *G06F 3/0659* (2013.01); *G06F 3/0679* (2013.01); *G06F 12/0292* (2013.01); *G06F 12/0891* (2013.01)

(58) Field of Classification Search
CPC .... G06F 3/0619; G06F 3/0659; G06F 3/0679; G06F 3/068; G06F 12/0292; G06F 12/0891; G06F 12/08; G06F 12/121; G06F 2212/1016; G06F 2212/217; G06F 2212/7201

See application file for complete search history.

(56) References Cited

U.S. PATENT DOCUMENTS

| | | | |
|---|---|---|---|
| 7,640,395 B2 | 12/2009 | Coulson et al. | |
| 7,966,456 B2 | 6/2011 | Trika et al. | |
| 7,970,989 B2 | 6/2011 | Matthews | |
| 9,671,971 B2 | 6/2017 | Trika et al. | |
| 10,261,717 B1* | 4/2019 | Martin | G06F 3/065 |
| 10,325,108 B2 | 6/2019 | Li et al. | |
| 10,685,097 B2 | 6/2020 | Sukhomlinov et al. | |
| 11,853,371 B1* | 12/2023 | Zhou | G06N 5/025 |
| 2003/0170012 A1* | 9/2003 | Cochran | G06F 11/2082 |
| | | | 386/234 |
| 2006/0015683 A1* | 1/2006 | Ashmore | G06F 1/3268 |
| | | | 711/135 |
| 2013/0024722 A1* | 1/2013 | Kotagiri | G06F 3/065 |
| | | | 714/6.1 |
| 2016/0139624 A1* | 5/2016 | Orr | G06F 12/0871 |
| | | | 713/400 |
| 2017/0031613 A1* | 2/2017 | Lee | G06F 3/065 |
| 2019/0102262 A1 | 4/2019 | Sukhomlinov et al. | |
| 2022/0147259 A1* | 5/2022 | Thakur | G06F 3/0647 |

* cited by examiner

*Primary Examiner* — Khoa D Doan
(74) *Attorney, Agent, or Firm* — Haley Guiliano LLP

(57) ABSTRACT

An embodiment of an electronic apparatus may comprise one or more substrates, and circuitry coupled to the one or more substrates, the circuitry to track transactions that access a first memory level of a multi-level memory, control access to at least the first memory level of the multi-level memory, and control a roll back of at least the first memory level of the multi-level memory based on the tracked transactions. In another embodiment, the circuitry is to control a roll back of a multi-level memory in response to a request to roll back the multi-level memory. Other embodiments are disclosed and claimed.

12 Claims, 8 Drawing Sheets

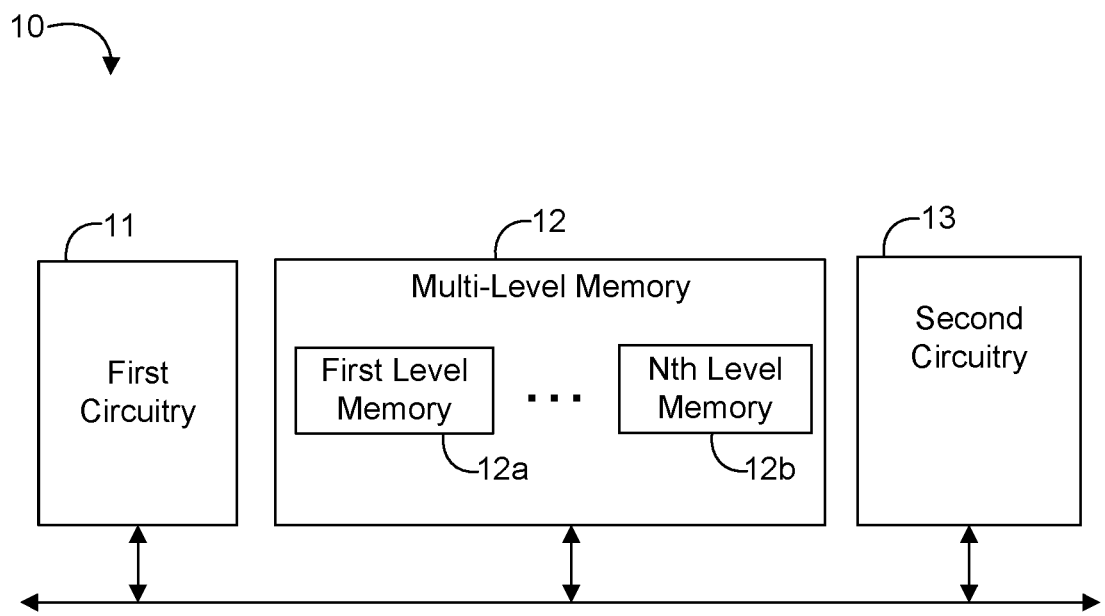
FIG. 1
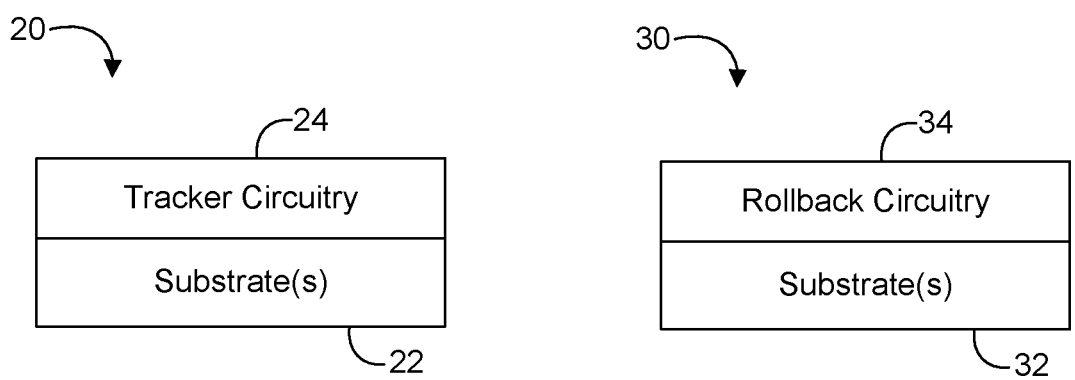
FIG. 2  FIG. 3

80 ⟶

*RollbackSectors (NumSectors)*
1. NumDirtiesOnCacheDevice = RollbackHelper.NumDirties()
2. RollbackAmountOnCacheDevice =
        max(NumSectors, NumDirtiesOnCacheDevice)
3. RollbackAmountOnBackingStore =
        max(0, NumSectors - RollbackAmountOnCacheDevice)
4. CacheDevice.Rollback(RollbackAmountOnCacheDevice)
5. BackingStore.Rollback(RollbackAmountOnBackingStore)
6. CacheController.RemoveFromTracking(RollbackAmountOnCacheDevice)

*RollbackTime (time deltaT)*
1. CacheDevice.Rollback(deltaT)
2. BackingStore.Rollback(deltaT)
3. CacheController.RollbackHelper.Rollback(t)

FIG. 9

DATA ROLLBACK FOR TIERED MEMORY AND STORAGE

BACKGROUND

Tiered memory and/or storage systems include heterogeneous memory/storage where a first memory/storage tier generally has lower latency with lower capacity and a second memory/storage tier generally has higher capacity with higher latency. Migration technology includes a wide variety of techniques utilized to efficiently move data between the first and second tiers. Data in a memory/storage device may be backed up at different points-in-time to allow restoration of data to a saved point-in-time as part of a process sometimes referred to as checkpointing. Operating system checkpointing may involve the operating system storing prior versions of updated data to create restore points or checkpoints to allow the user to return the state of the data to that checkpoint. System backups may include a backup of all or most of the data in a drive as of a checkpoint time to another partition on the memory/storage device or another memory/storage device. System backups may run on the host system and consume significant host resources, which may result in performance degradation at the host system.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is a block diagram of an example of an electronic system according to an embodiment;

FIG. 2 is a block diagram of an example of an electronic apparatus according to an embodiment;

FIG. 3 is a block diagram of another example of an electronic apparatus according to an embodiment;

FIG. 8 is an illustrative diagram of an example of pseudo-code according to an embodiment;

FIG. 9 is an illustrative diagram of another example of pseudo-code according to an embodiment;

DETAILED DESCRIPTION

Figure 4:
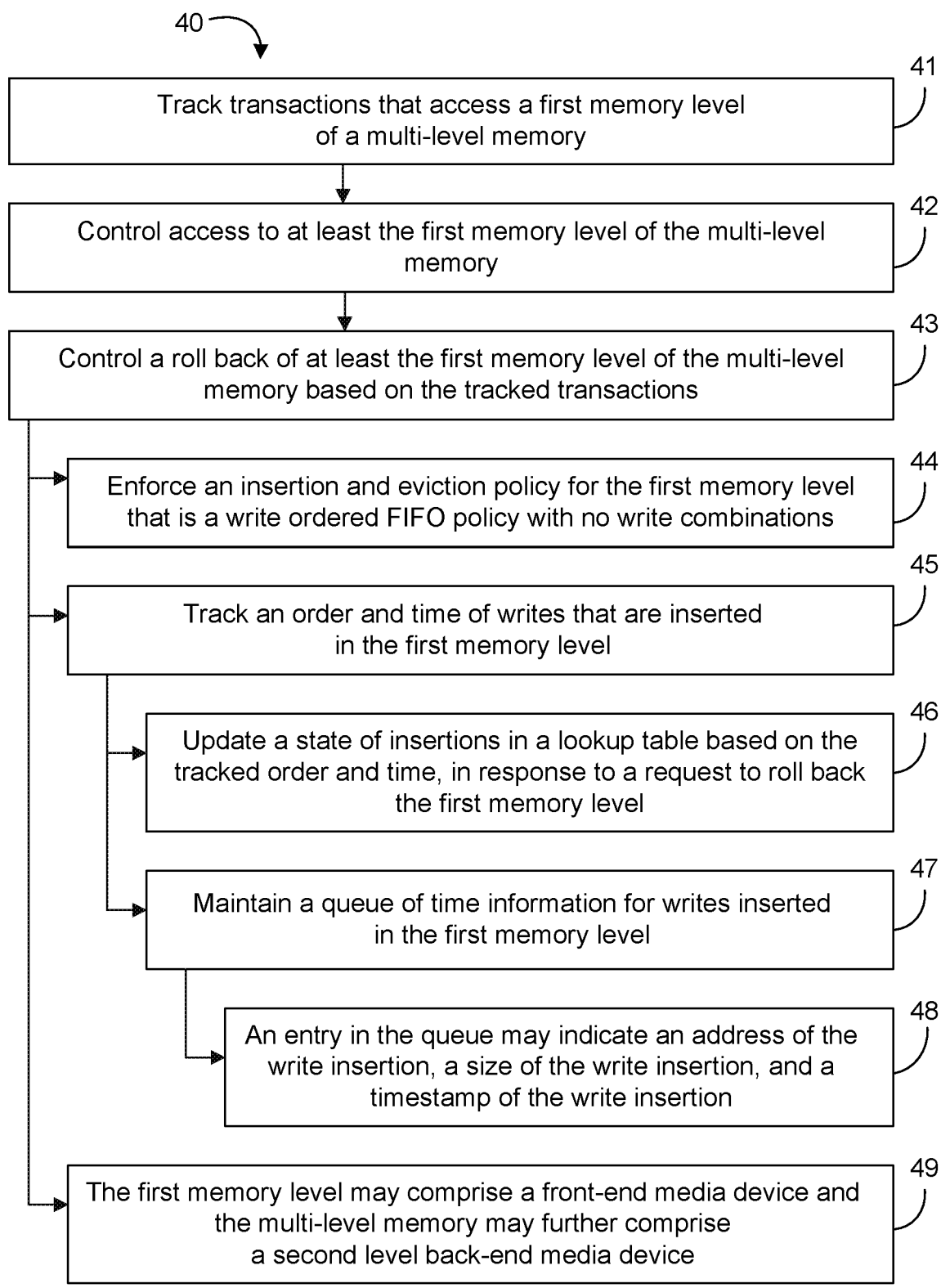
FIG. 4 is a flowchart of an example of a method according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, Field Programmable Gate Array (FPGA), firmware, driver, software, or any combination thereof. The material disclosed herein may also be implemented as instructions stored on a machine-readable medium, which may be read and executed by Moore Machine, Mealy Machine, and/or one or more processors. A machine-readable medium may include any medium and/or mechanism for storing or transmitting information in a form readable by a machine (e.g., a computing device). For example, a machine-readable medium may include read only memory (ROM); random access memory (RAM); Dynamic random-access memory (DRAM), magnetic disk storage media; optical storage media; NV memory devices; phase-change memory, qubit solid-state quantum memory, electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

As used herein, the terms "memory" and "storage" may generally be considered to be interchangeable. Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a three dimensional (3D) crosspoint memory device, or other byte addressable write-in-place nonvolatile memory devices. In one embodiment, the memory device may be or may include memory devices that use chalcogenide glass, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, or other suitable standard (the JEDEC standards cited herein are available at jedec.org). Non-limiting examples of NV a memory/storage device include a hard-disk drive (HDD) and a solid-state drive (SSD).

In some embodiments, a memory or storage device may include any suitable checkpoint or rollback technology. For example, a storage device such as a SSD may include technology where a logical-to-physical (L2P) mapping indicates for each logical address a physical address in the SSD having current data for the logical address and version information indicating whether there is a prior version of data for the logical address. In response to the L2P mapping indicating that there is no prior version of the data for a target logical address of a write, the SSD may include information on the target physical address and the physical address indicated in the L2P mapping in checkpoint information. The version information for the target logical address is updated to indicate that there is a prior version of data. Data for the write is written to a target physical address. The L2P mapping for the target logical address is updated to indicate the target physical address. The SSD indirection system and garbage collection, along with specific host commands, support checkpointing and restore capabilities. Extra SSD capacity is used to maintain data that must be maintained for rollback.

A storage device may further include technology to allow checkpointing per set of logical block address (LBA)-ranges (e.g., per file). For example, a controller of a SSD may be configured to receive a checkpoint command including a logical address to checkpoint. The controller may then perform the checkpoint command by marking the logical address as checkpointed, storing a first mapping of the logical address to a first physical address (e.g., where data associated with the logical address is stored at the first physical address prior to the receipt of the checkpoint command), and mapping the logical address to a second physical address. In response to a restore checkpoint command that identifies the logical address, the controller may be configured to map the logical address back to the first physical address (e.g., by writing the first physical address over the second physical address in a L2P address table).

Another example of suitable checkpoint/rollback technology includes a SSD that checkpoints automatically and continuously without requiring the host to issue checkpoint commands. The SSD controller performs continuous checkpointing. With continuous checkpointing, the information necessary for system rollback is continuously recorded without the need of a specific command. With the rollback information, the system can rollback or restore to any previous state up to a number of previous writes or up to an amount of data. The number of writes or the amount of data that can be restored may be configurable. For example, the SSD controller may be configured to translate logical addresses to physical addresses for writes to the SSD and to maintain a log of a most recent N writes, where N represents a configurable amount of data (e.g., N may indicate a number of writes that occur within a time period, or N may indicate a number of writes that represent an amount of storage capacity). The SSD controller may be further configured to write data to unused physical addresses as active data, and maintain stale data for the most recent N writes. With this technology, the SSD state may be rolled back by a certain amount of time or by a certain number of sector writes.

Another example of suitable checkpoint/rollback technology includes a SSD that provides checkpointing control to applications for data residing on the SSD. For example, the SSD controller may be configured to receive an application-related checkpoint request corresponding to a file of a file system stored on the SSD, determine one or more checkpoint operations internal to the SSD to perform the application-related checkpoint request, and apply one or more policies to the checkpoint request (e.g., at least one of the one or more policies may be to inhibit a denial-of-service attack from the checkpoint request by limiting the number of such checkpoint requests from an associated application).

The foregoing checkpoint/rollback technology is applied to a single level of storage, but encounters problems on a cached or tiered storage system. Some embodiments may advantageously provide technology for data roll back in tiered and cached memory/storage configurations. Some embodiments may advantageously provide coordination of writes and time between a front-end device and a back-end device in a cached storage system.

Data recovery/rollback is an important capability desired in many compute systems. For example, rollback may provide incremental backups, undelete capabilities, and even system recovery solutions to problems such as malware and ransomware. Some rollback technology relies on performing log-structured writes on the media while ensuring that the data that may be required for rollback is not erased. However, caching/tiered memory configurations may present problems for conventional rollback technology. Conventional technology may not reliably rollback the data state because the storage-cache driver generally flushes data out-of-order and with write coalescing, from the cache to the backing store. The cache volatile-metadata is also left out of synch if rollback is issued equally to all constituent front-end and back-end devices.

Some embodiments overcome one or more of the foregoing problems. Embodiments advantageously extend rollback technology to cached and tiered storage systems. Some embodiments provide technology to coordinate both front-end media device(s) and back-end media device(s) to ensure that the entire system is able to rollback. Some embodiments may also enable a "ReadOld" capability on cached/tiered storage systems, that allows reading a previous data-state (e.g., N minutes back) without rolling back the current state.

Tiered and cached storage systems are used in many client and datacenter systems, which may benefit from embodiments of the rollback technology described herein. While some embodiments are described in the context of a front-end media device caching a back-end media device, embodiments may apply to a wide variety of tiered or cached storage systems including, for example, software systems, SSDs with different media types, serial peripheral interface (SPI) storage, log-structured merge (LSM)-based Key-Value solutions, INTEL OPTANE based systems, rack-array systems, etc.

With reference to FIG. 1, an embodiment of an electronic system 10 may include a multi-level memory 12 that includes first through Nth level memory devices (e.g., N>1) with at least a front-end media device 12a and a back-end media device 12b, first circuitry 11 communicatively coupled to the multi-level memory 12 to track transactions that access the multi-level memory 12 and to control access to at least the front-end media device 12a, and second circuitry 13 communicatively coupled to the first circuitry 11 to control a roll back of the multi-level memory 12. For example, the first circuitry 11 may be configured to enforce an insertion and eviction policy for the front-end media device 12a that is a write ordered first-in-first-out (FIFO) policy with no write combinations. In some embodiments, the first circuitry 11 may be further configured to track an order and time of writes that are inserted in the front-end media device 12a. For example, the first circuitry 11 may be configured to update a state of insertions in a lookup table based on the tracked order and time, in response to a request to roll back the front-end media device 12a.

In some embodiments, the second circuitry 13 may be further configured to determine a first number of sectors to rollback for the front-end media device 12a in response to a request to roll back the multi-level memory 12, and determine a second number of sectors to rollback for the back-end media device 12b in response to the request to roll back the multi-level memory 12 (e.g., where the second number is different from the first number). For example, the second circuitry 13 may be configured to issue a first rollback command to the first circuitry 11 that indicates the first number of sectors to roll back the front-end media device 12a, and issue a second rollback command to the first circuitry 11 that indicates the second number of sectors to roll back the back-end media device 12b.

Additionally, or alternatively, the second circuitry 13 may be further configured to determine an amount of time for rollback of each level of the multi-level memory 12 in response to a request to roll back the multi-level memory 12. For example, the second circuitry 13 may be configured to issue respective roll back commands to the first circuitry 11 for each level of the multi-level memory 12 that indicate the amount of time to roll back each level of the multi-level memory 12.

Embodiments of each of the above multi-level memory 12, first circuitry 11, second circuitry 13, and other system components may be implemented in hardware, software, or any suitable combination thereof. For example, hardware implementations may include configurable logic such as, for example, programmable logic arrays (PLAs), FPGAs, complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Embodiments of the first circuitry 11 and/or second circuitry 13 may be incorporated in a general purpose controller, a special purpose controller, a memory controller, a storage controller, a micro-controller, a general purpose processor, a special purpose processor, a central processor unit (CPU), an execution unit, etc. In some embodiments, the multi-level memory 12, the first circuitry 11, the second circuitry 13, and/or other system memory may be located in, or co-located with, various components, including a processor (e.g., on a same die).

Alternatively, or additionally, all or portions of these components may be implemented in one or more modules as a set of logic instructions stored in a machine- or computer-readable storage medium such as RAM, ROM, programmable ROM (PROM), firmware, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages. For example, the multi-level memory 12, persistent storage media, or other system memory may store a set of instructions (e.g., which may be firmware instructions) which when executed by the first circuitry 11 and/or second circuitry 13 cause the system 10 to implement one or more components, features, or aspects of the system 10 (e.g., tracking transactions that access the multi-level memory, controlling the roll back of the multi-level memory, etc.).

With reference to FIG. 2, an embodiment of an electronic apparatus 20 may include one or more substrates 22, and circuitry 24 (e.g., tracker circuitry) coupled to the one or more substrates 22. The circuitry 24 may be configured to track transactions that access a first memory level of a multi-level memory, control access to at least the first memory level of the multi-level memory, and control a roll back of at least the first memory level of the multi-level memory based on the tracked transactions. In some embodiments, the circuitry 24 may be further configured to enforce an insertion and eviction policy for the first memory level that is a write ordered FIFO policy with no write combinations. In some embodiments, the circuitry 24 may also be configured to track an order and time of writes that are inserted in the first memory level. For example, the circuitry 24 may be configured to update a state of insertions in a lookup table based on the tracked order and time, in response to a request to roll back the first memory level. Additionally, or alternatively, the circuitry 24 may be configured to maintain a queue of time information for writes inserted in the first memory level. For example, an entry in the queue may indicate an address of the write insertion, a size of the write insertion, and a timestamp of the write insertion. In some embodiments, the first memory level may comprise a front-end media device and the multi-level memory may further comprise a second level back-end media device. For example, the circuitry 24 may be incorporated in a memory controller, a cache controller, etc.

With reference to FIG. 3, an embodiment of an electronic apparatus 30 may include one or more substrates 32, and circuitry 34 (e.g., rollback circuitry) coupled to the one or more substrates 32. The circuitry 34 may be configured to control a roll back of a multi-level memory in response to a request to roll back the multi-level memory. For example, the circuitry 34 may be configured to determine respective numbers of sectors to roll back for each level of the multi-level memory in response to the request to roll back the multi-level memory. In some embodiments, the circuitry 34 may be configured to determine a first number of sectors to roll back a first memory level of the multi-level memory, and to determine a second number of sectors to roll back a second memory level of the multi-level memory based on a number of sectors indicated in the request to roll back the multi-level memory reduced by the determined first number of sectors. For example, the circuitry 34 may be configured to issue respective rollback commands that indicate the respective determined numbers of sectors to rollback each level of the multi-level memory. Additionally, or alternatively, the circuitry 34 may be configured to determine an amount of time for rollback of each level of the multi-level memory in response to a request to roll back the multi-level memory. For example, the circuitry 34 may be configured to issue respective roll back commands that indicate the amount of time to roll back each level of the multi-level memory. In some embodiments, the multi-level memory comprises a first level front-end media device and a second level back-end media device. For example, the circuitry 34 may be incorporated in a rollback controller.

Embodiments of the circuitry 24 and/or 34 may be implemented in a system, apparatus, computer, device, etc., for example, such as those described herein. More particularly, hardware implementations of the circuitry 24 and/or 34 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the circuitry 24 and/or 34 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the circuitry 24 and/or 34 may be implemented on a semiconductor apparatus, which may include the one or more substrates, with the circuitry 24 and/or 34 coupled to the one or more substrates. In some embodiments, the circuitry 24 and/or 34 may be at least partly implemented in one or more of configurable logic and fixed-functionality hardware logic on semiconductor substrate(s) (e.g., silicon, sapphire, gallium-arsenide, etc.). For example, the circuitry 24 and/or 34 may include a transistor array and/or other integrated circuit components coupled to the substrate(s) with transistor channel regions that are positioned within the substrate(s). The interface between the circuitry 24 and/or 34 and the substrate(s) may not be an abrupt junction. The circuitry 24 and/or 34 may also be considered to include an epitaxial layer that is grown on an initial wafer of the substrate(s). In some embodiments, all or portions of the circuitry 24 and 34 may be coupled to the same substrate.

Turning now to FIG. 4, an embodiment of a method 40 may include tracking transactions that access a first memory level of a multi-level memory at block 41, controlling access to at least the first memory level of the multi-level memory at block 42, and controlling a roll back of at least the first memory level of the multi-level memory based on the tracked transactions at block 43. The method 40 may also include enforcing an insertion and eviction policy for the first memory level that is a write ordered FIFO policy with no write combinations at block 44. Additionally, or alternatively, the method 40 may include tracking an order and time of writes that are inserted in the first memory level at block 45. For example, the method 40 may include updating a state of insertions in a lookup table based on the tracked order and time, in response to a request to roll back the first memory level at block 46. Some embodiments of the method 40 may further include maintaining a queue of time information for writes inserted in the first memory level at block 47. For example, an entry in the queue may indicate an address of the write insertion, a size of the write insertion, and a timestamp of the write insertion at block 48. In some embodiments, the first memory level may comprise a front-end media device and the multi-level memory may further comprise a second level back-end media device at block 49.

Figure 5:
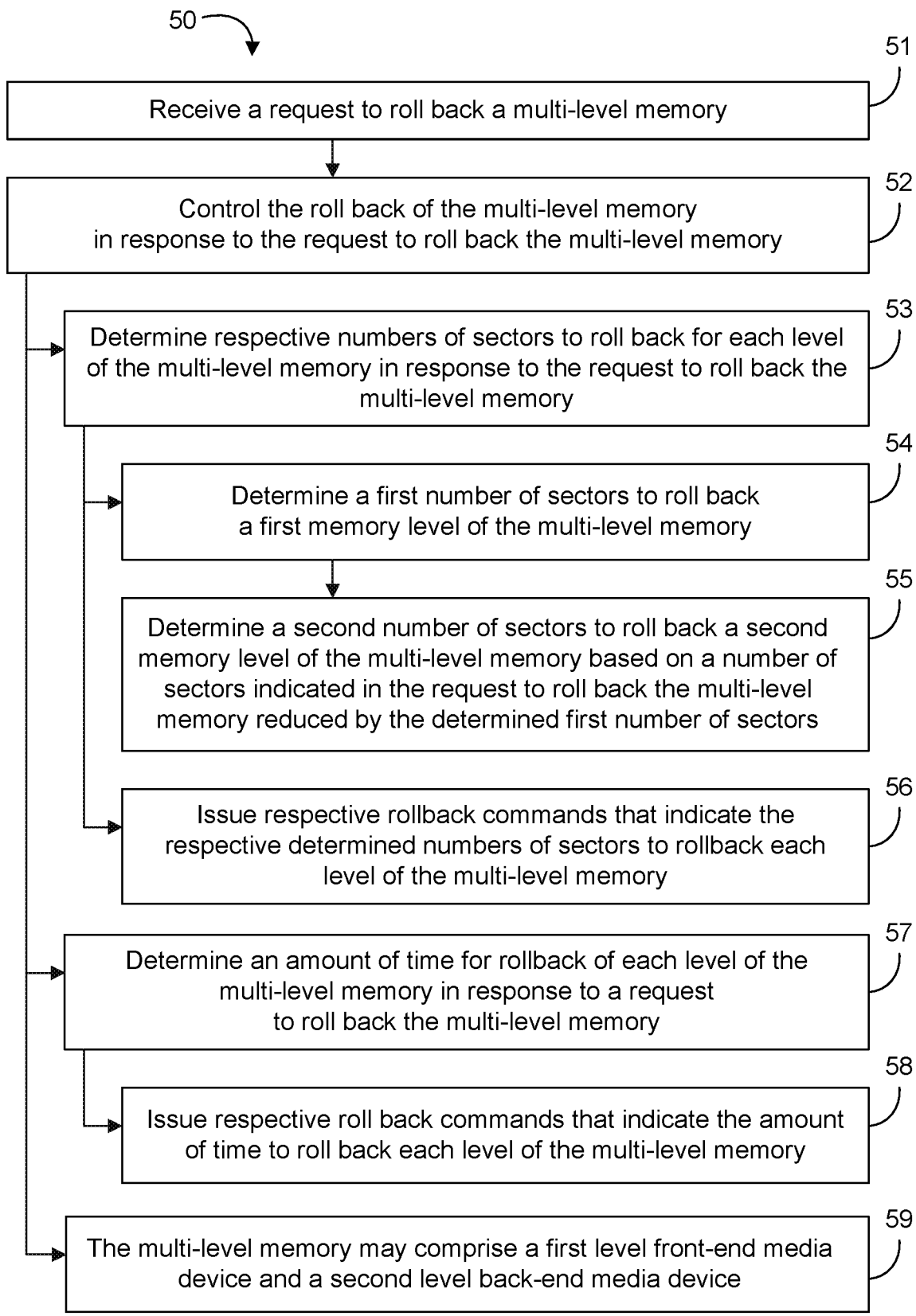
FIG. 5 is a flowchart of another example of a method according to an embodiment.

Turning now to FIG. 5, an embodiment of a method 50 may include receiving a request to roll back a multi-level memory at block 51, and controlling the roll back of the multi-level memory in response to the request to roll back the multi-level memory at block 52. Some embodiments of the method 50 may further include determining respective numbers of sectors to roll back for each level of the multi-level memory in response to the request to roll back the multi-level memory at block 53. For example, the method 50 may include determining a first number of sectors to roll back a first memory level of the multi-level memory at block 54, and determining a second number of sectors to roll back a second memory level of the multi-level memory based on a number of sectors indicated in the request to roll back the multi-level memory reduced by the determined first number of sectors at block 55. The method 50 may also include issuing respective rollback commands that indicate the respective determined numbers of sectors to rollback each level of the multi-level memory at block 56. Additionally, or alternatively, the method 50 may include determining an amount of time for rollback of each level of the multi-level memory in response to a request to roll back the multi-level memory at block 57, and issuing respective roll back commands that indicate the amount of time to roll back each level of the multi-level memory at block 58. In some embodiments, the multi-level memory may comprise a first level front-end media device and a second level back-end media device at block 59.

Embodiments of the methods 40 and/or 50 may be implemented in a system, apparatus, computer, device, etc., for example, such as those described herein. More particularly, hardware implementations of the methods 40 and/or 50 may include configurable logic such as, for example, PLAs, FPGAs, CPLDs, or in fixed-functionality logic hardware using circuit technology such as, for example, ASIC, CMOS, or TTL technology, or any combination thereof.

Hybrid hardware implementations include static dynamic System-on-Chip (SoC) re-configurable devices such that control flow, and data paths implement logic for the functionality. Alternatively, or additionally, the methods 40 and/or 50 may be implemented in one or more modules as a set of logic instructions stored in a machine- or computer-readable storage medium such as RAM, ROM, PROM, firmware, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C#, VHDL, Verilog, System C or the like and conventional procedural programming languages, such as the "C" programming language or similar programming languages.

For example, the methods 40 and/or 50 may be implemented on a computer readable medium. Embodiments or portions of the methods 40 and/or 50 may be implemented in firmware, applications (e.g., through an application programming interface (API)), or driver software running on an OS. Additionally, logic instructions might include assembler instructions, instruction set architecture (ISA) instructions, data set architecture (DSA) commands, (machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, Moore Machine, Mealy Machine, etc.).

A computer system may have heterogeneous memory (e.g., or tiered memory) with varying performance characteristics. For example, besides dynamic random access memory (DRAM), a system may also have high bandwidth memory (HBM), persistent memory (e.g., INTEL OPTANE, etc.), storage class memory (SCM), etc. on server and client systems. Systems may also have accelerators with local memory (e.g., HBM on GPUs) or remote pooled memory attached via a coherent link such as Compute Express Link (CXL). These memory regions may be exposed to the OS at different physical address ranges typically in separate storage nodes.

A processor may have cacheable (e.g., write-back) access to all the different memory regions. Memory accesses may be performed by many different entities in a system. The CPU is the most typical memory access initiator, but many kinds of devices may also act as initiators. An OS and/or a virtual machine monitor (VMM) may manage the tiered memory to optimize overall performance of the system. Some embodiments provide hardware support to enhancing memory placement and migration decisions by the OS/VMM to provide workloads an improved or optimal price/performance from all the tiered memory in the system.

Figure 6:
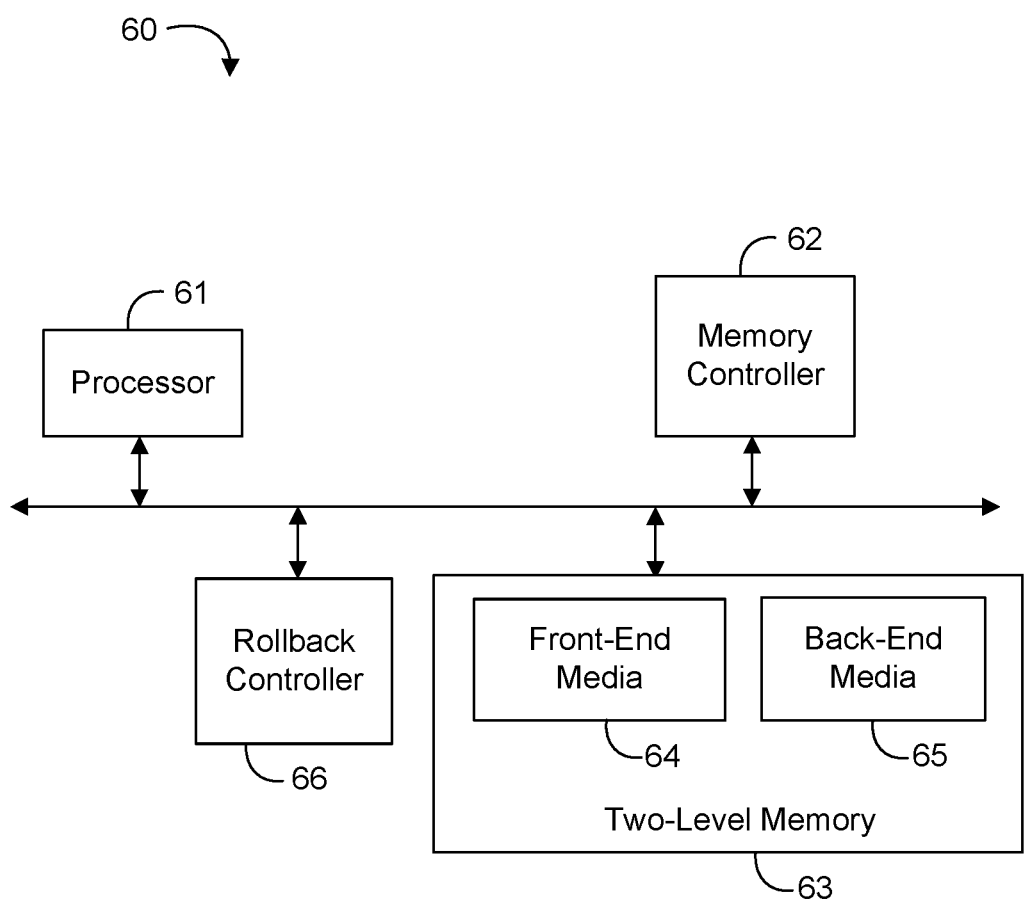
FIG. 6 is a block diagram of an example of a compute system according to an embodiment.

Turning now to FIG. 6, an embodiment of an electronic system 60 may include a processor 61, a memory controller 62, and a two-level memory 63 including a front-end media 64 and a back-end media 65. In various embodiments, any of the front-end media 64 and the back-end media 65 may include volatile memory and/or nonvolatile memory. The front-end media 64 may be smaller and faster media, and the back-end media 65 may be larger and slower media. For example, the front-end 64 may include smaller, faster DRAM. The back-end 65 may include larger capacity storage, such as an INTEL OPTANE solid-state drive (SSD).

The processor 61 may have cacheable access to the back-end media 65 via the front-end media 64. The back-end media 65 may include rollback technology as described herein. In particular, the back-end media 65 may include an interface to process rollback commands from a controller. The system 60 may further include the rollback controller 66 to control a roll back of the two-level memory 63. For example, the memory controller 62 may be configured to track transactions that access the two-level memory 63 and to control access to at least the front-end media 64. The rollback controller 66 may be configured to control a roll back of the two-level memory 63. For example, the memory controller 62 may be configured to enforce an insertion and eviction policy for the front-end media 64 that is a write ordered FIFO policy with no write combinations. In some embodiments, the memory controller 62 may be further configured to track an order and time of writes that are inserted in the front-end media 64. For example, the memory controller 62 may be configured to update a state of insertions in a lookup table based on the tracked order and time, in response to a request to roll back the front-end media 64.

In some embodiments, the rollback controller 66 may be further configured to determine a first number of sectors to rollback for the front-end media 64 in response to a request to roll back the two-level memory 63, and determine a second number of sectors to rollback for the back-end media 65 in response to the request to roll back the two-level memory 63 (e.g., where the second number is different from the first number). For example, the rollback controller 66 may be configured to issue a first rollback command to the memory controller 62 that indicates the first number of sectors to roll back the front-end media 64, and issue a second rollback command to the memory controller 62 that indicates the second number of sectors to roll back the back-end media 65.

In some embodiments, the memory controller 62 and/or the rollback controller may be integrated on a same die as the processor 61, while the front-end media 64 and the back-end media 65 may be separate components. In some embodiments, the front-end media 64 and the back-end media 65 may have different interfaces with the processor 61, and may not share a bus. In some embodiments, the memory controller 62 may be physically or logically divided as a direct access memory controller, a front-end media controller, and/or a memory controller for the entire two-level memory 63.

Figure 7:
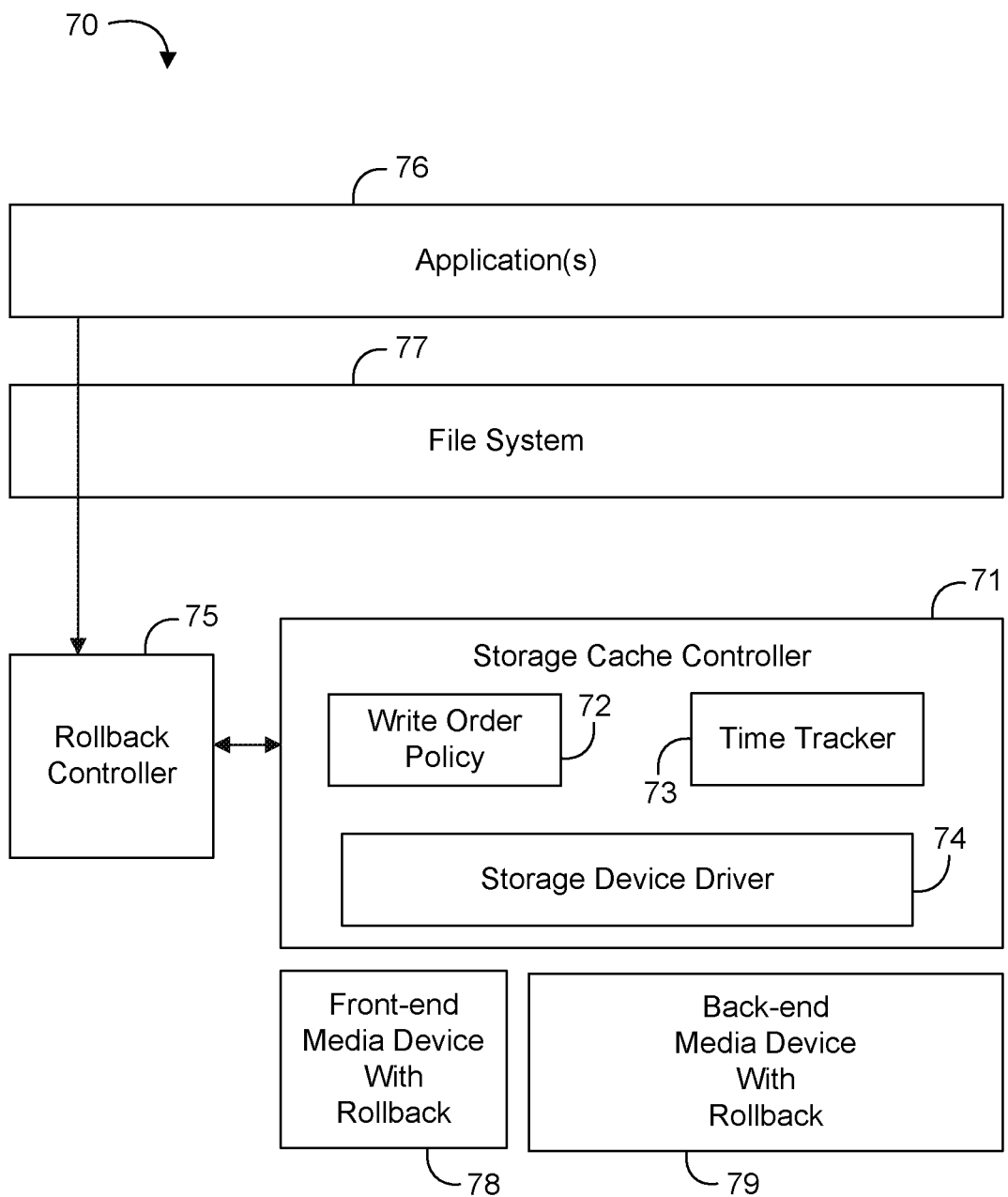
FIG. 7 is a block diagram of another example of a compute system according to an embodiment.

With reference to FIG. 7, an embodiment of a compute system 70 includes a storage cache controller 71 that includes logic/circuitry 72 to enforce a write order policy and a time tracker 73. The controller 71 further includes a storage device driver 74. The controller 71 is in communication with a rollback controller 75. Application(s) 76 access storage via a file system 77. The controller 71 controls access to the storage, where the storage comprises a storage-cached system with a front-end media device 78 and a back-end media device 79, both of which are configured with rollback technology. For example, both the front-end media device 78 and the back-end media device 79 may include automatic continuous checkpoint technology that allows independent rollback of each device either a specified number of sectors or a specified amount of time.

In accordance with some embodiments, the rollback-controller 75 partners with the storage-cache/tier controller 71. In some embodiments, the rollback controller 75 is configured to determine how many sectors or how much time to rollback each device (e.g., where the front-end media device 78 acts as a cache and the back-end media device 79 acts as a backing store). To maintain correct rollback-able data state across devices, the controller 71 enforces cache/ tier insertion and eviction policies for writes that are strictly write-ordered FIFO, without write-combining. For example, the front-end media device 78 (e.g., a first type of media that is faster, but has less storage capacity) may cache data for the back-end media device 79 (e.g., a second type of media that is slower, but has higher storage capacity). Other systems may include more tiers/levels, as described below.

In some embodiments, the rollback controller 75 may be configured to initialize the rollback functionality at system boot. The rollback controller 75 may be further configured to receive a rollback command from application/file-system layers, and to execute the rollback commands using the techniques described herein. In some embodiments, the rollback controller 75 may be implemented as a separate module. Alternatively, all or portions of the rollback controller 75 may be integrated within the storage cache controller 71.

In some embodiments, the storage cache controller 71 may be configured to track time. Upon a rollback request, not only do the cache device (e.g., the front-end media device 78) and the backing store (e.g., the back-end media device 79) need to rollback their state, but the storage cache controller 71 must also update its own state to roll back cache inserts in a lookup table maintained by the controller 71. To update the lookup table, at runtime, the controller 71 tracks the order in which the writes were inserted (e.g., dirty in writeback mode or clean in write-through mode) into the cache, as well as a timestamp for all dirty data inserted into the front-end media device 78 (e.g., the cache). The ordering information is maintained using any suitable cache technique(s). In some embodiments, the time information is maintained in a queue for write-requests inserted in the front-end media device 78, where each entry in the queue contains the corresponding cacheline address, the number of dirty sectors corresponding to the cacheline write, and a timestamp.

With respect to insertion and eviction policies, a cache insertion policy on reads is not affected by rollback capability. Write insertion, however, is enforced to support write-ordering with any suitable technique(s). Overwrite optimization is turned off such that even if the same cacheline is written, the cacheline is not overwritten it in the cache. Instead, copies of both old and new data are kept. Eviction policies are also enforced to ensure that data is written in-order from the storage-cache to the backing store.

With reference to FIG. 8, an embodiment of pseudo-code 80 represents one example of a rollback algorithm for a cached volume, for rolling back a specified number of sectors. For example, the pseudo-code 80 may be executed by a rollback controller such as those described herein, in response to a request from an agent (e.g., a host, a processor, an application, an OS, a VMM, etc.) to rollback a multi-level storage system with a cache device and a backing store. A RollbackSectors(NumSectors) command requests rollback processing by a specified number of sectors (e.g., rollback volume state by N sector writes). For example, both the cache device and the backing store may include automatic continuous checkpoint technology that provides the capability to roll back the devices by a specified number of sectors. In lines 1-3, as illustrated, the pseudo-code 80 first computes the amount of sector writes to rollback on both the devices. In lies 4-5, the pseudo-code 80 then issues the rollback commands with the computed parameters to the corresponding devices. Note that the number of rollback writes issued to the backing store is not what the command requested, and is in fact reduced by the corresponding rollback on the cache store. The reduction is enabled because of the enforced write-ordering discussed above. At line 6, a rollback on the cache state maintained in volatile metadata is then performed by requesting the cache controller to do the same. In particular, the pseudo-code 80 requests the cache controller to remove the last <RollbackAmountOnCacheDevice> writes from tracking (e.g., marking the corresponding cachelines as invalid, even though they were valid earlier). The cache controller uses the FIFO queue mentioned above to pop the associated number of writes from the queue, and invalidate the corresponding cachelines by updating the cache volatile metadata structure.

With reference to FIG. 9, an embodiment of pseudo-code 90 represents one example of a rollback algorithm for a cached volume, for rolling back by a specified amount of time. For example, the pseudo-code 90 may be executed by a rollback controller such as those described herein, in response to a request from an agent (e.g., a host, a processor, an application, an OS, a VMM, etc.) to rollback a multi-level storage system with a cache device and a backing store. A RollbackTime(time deltaT) command requests rollback processing by a specified amount of time (e.g., rollback the volume state by deltaT=5 minutes). For example, both the cache device and the backing store may include automatic continuous checkpoint technology that provides the capability to roll back the devices by a specified amount of time. In lines 1-2, the pseudo-code 90 exercises the time-based rollback capability of each of the devices. At line 3, the pseudo-code 90 requests the cache controller to rollback the cache controller's state. As noted above, the cache controller keeps track of time per write-insert in the cache controller, and uses that information for rollback. To update the cache controller state, the cache controller utilizes both the write-order FIFO queue and the lookup table update described above. For example, entries in the queue are iteratively queried from the tail (pop) end of the queue and if an entry's timestamp is within the rollback window, the entry is dequeued and the corresponding cacheline is invalidated.

Figure 10:
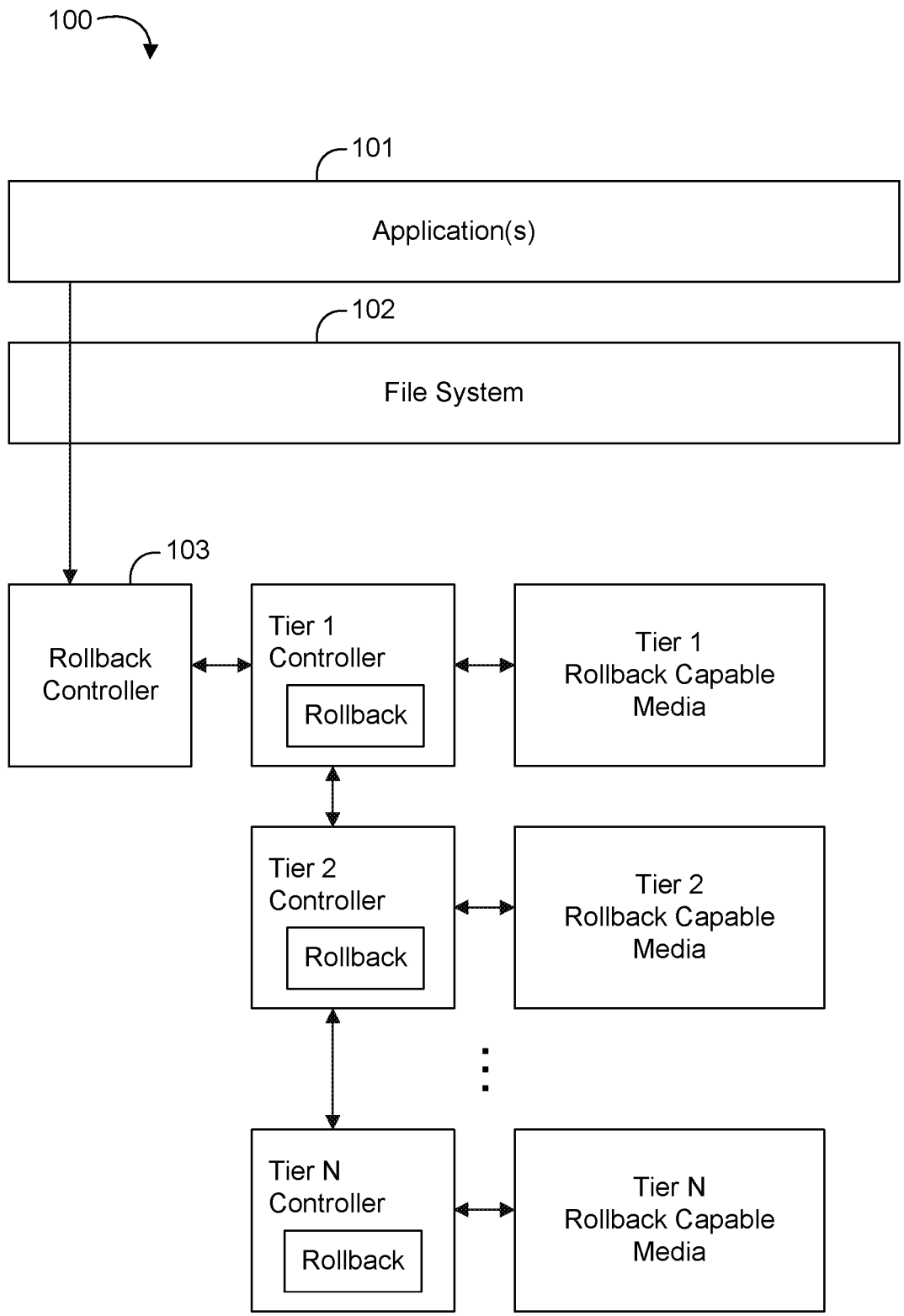
FIG. 10 is a block diagram of another example of a compute system according to an embodiment.

With reference to FIG. 10, an embodiment of a compute system 100 includes application(s) 101 that access a tiered storage system via a file system 102. In accordance with some embodiments, the tiered storage system includes a rollback controller 103 communicatively coupled to N tiers of storage (e.g., N>1). Each tier of storage includes rollback capable media and a tier controller with rollback technology as described herein. One or more of the tiers may not be utilized as a cache device, in some embodiments, in which case a rollback command may simply be propagated to each of the underlying constituent devices. Because no state is maintained in such a tier controller, there is no need to rollback a state of the volatile structures/metadata.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 11:
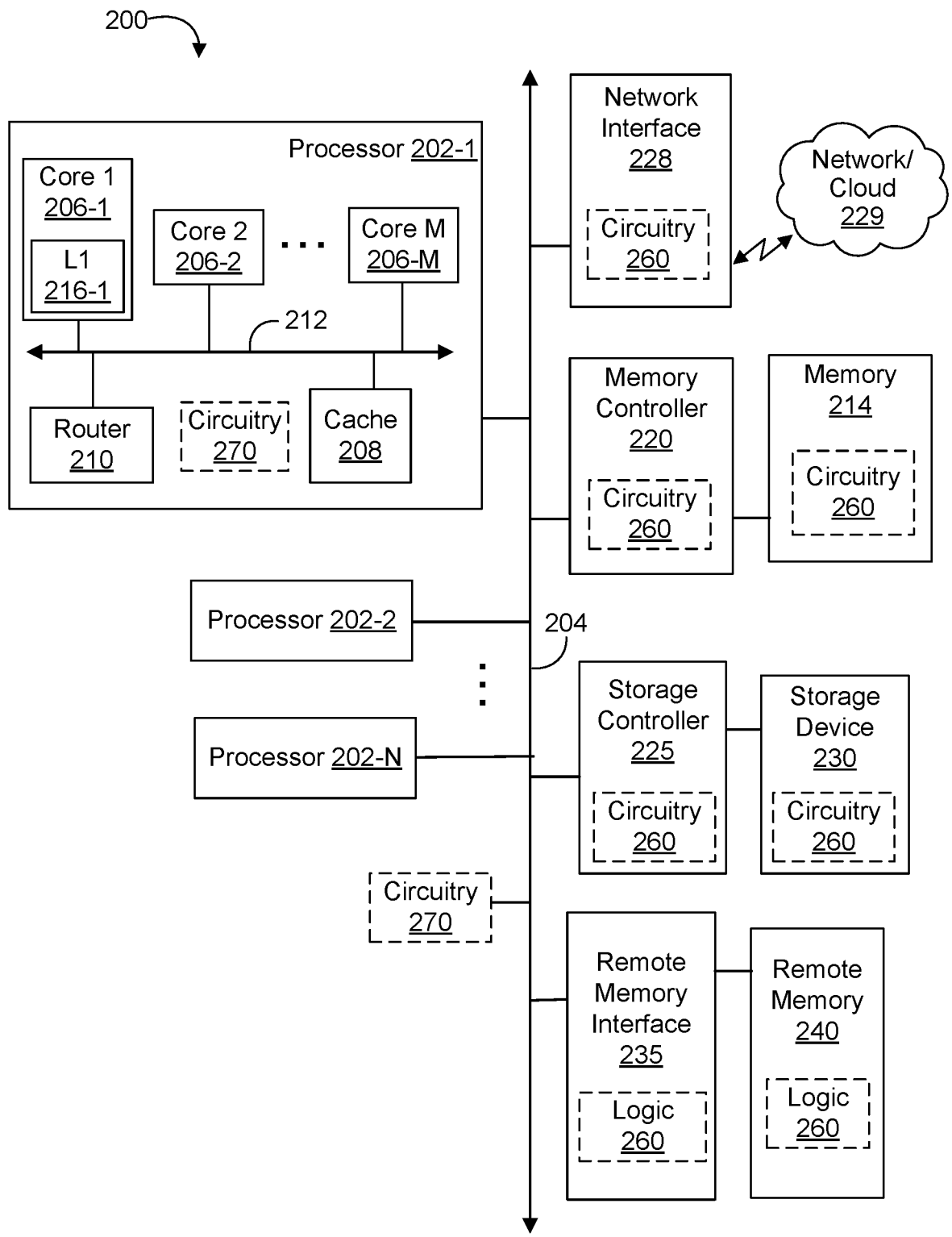
FIG. 11 is a block diagram of an example of a computing system according to an embodiment.

Turning now to FIG. 11, an embodiment of a computing system 200 may include one or more processors 202-1 through 202-N (generally referred to herein as "processors 202" or "processor 202"). The processors 202 may communicate via an interconnection or bus 204. Each processor 202 may include various components some of which are only discussed with reference to processor 202-1 for clarity. Accordingly, each of the remaining processors 202-2 through 202-N may include the same or similar components discussed with reference to the processor 202-1.

In some embodiments, the processor 202-1 may include one or more processor cores 206-1 through 206-M (referred to herein as "cores 206," or more generally as "core 206"), a cache 208 (which may be a shared cache or a private cache in various embodiments), and/or a router 210. The processor cores 206 may be implemented on a single integrated circuit (IC) chip. Moreover, the chip may include one or more shared and/or private caches (such as cache 208), buses or interconnections (such as a bus or interconnection 212), circuitry 270, memory controllers, or other components.

In some embodiments, the router 210 may be used to communicate between various components of the processor 202-1 and/or system 200. Moreover, the processor 202-1 may include more than one router 210. Furthermore, the multitude of routers 210 may be in communication to enable data routing between various components inside or outside of the processor 202-1.

The cache 208 may store data (e.g., including instructions) that is utilized by one or more components of the processor 202-1, such as the cores 206. For example, the cache 208 may locally cache data stored in a memory 214 for faster access by the components of the processor 202. As shown in FIG. 11, the memory 214 may be in communication with the processors 202 via the interconnection 204. In some embodiments, the cache 208 (that may be shared) may have various levels, for example, the cache 208 may be a mid-level cache and/or a last-level cache (LLC). Also, each of the cores 206 may include a level 1 (L1) cache (216-1) (generally referred to herein as "L1 cache 216"). Various components of the processor 202-1 may communicate with the cache 208 directly, through a bus (e.g., the bus 212), and/or a memory controller or hub.

As shown in FIG. 11, memory 214 may be coupled to other components of system 200 through a memory controller 220. Memory 214 may include volatile memory and may be interchangeably referred to as main memory or system memory. Even though the memory controller 220 is shown to be coupled between the interconnection 204 and the memory 214, the memory controller 220 may be located elsewhere in system 200. For example, memory controller 220 or portions of it may be provided within one of the processors 202 in some embodiments. Alternatively, memory 214 may include byte-addressable non-volatile memory such as INTEL OPTANE technology.

The system 200 may communicate with other devices/systems/networks via a network interface 228 (e.g., which is in communication with a computer network and/or the cloud 229 via a wired or wireless interface). For example, the network interface 228 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 229.

System 200 may also include a storage device such as a storage device 230 coupled to the interconnect 204 via storage controller 225. Hence, storage controller 225 may control access by various components of system 200 to the storage device 230. Furthermore, even though storage controller 225 is shown to be directly coupled to the interconnection 204 in FIG. 11, storage controller 225 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, CXL, etc.) with one or more other components of system 200 (for example where the storage bus is coupled to interconnect 204 via some other logic like a bus bridge, chipset, etc.) Additionally, storage controller 225 may be incorporated into memory controller logic or provided on a same integrated circuit (IC) device in various embodiments (e.g., on the same circuit board device as the storage device 230 or in the same enclosure as the storage device 230).

Furthermore, storage controller 225 and/or storage device 230 may be coupled to one or more sensors (not shown) to receive information (e.g., in the form of one or more bits or signals) to indicate the status of or values detected by the one or more sensors. These sensor(s) may be provided proximate to components of system 200 (or other computing systems discussed herein), including the cores 206, interconnections 204 or 212, components outside of the processor 202, storage device 230, SSD bus, SATA bus, storage controller 225, circuitry 260, circuitry 270, etc., to sense variations in various factors affecting power/thermal behavior of the system/platform, such as temperature, operating frequency, operating voltage, power consumption, and/or inter-core communication activity, etc.

System 200 may also include remote memory 240 coupled to the interconnect 204 via remote memory interface 235. Hence, remote memory interface 235 may control access by various components of system 200 to the remote memory 240. Furthermore, even though remote memory interface 235 is shown to be directly coupled to the interconnection 204 in FIG. 11, remote memory interface 235 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), Serial Attached SCSI (SAS), Fiber Channel, CXL, etc.) with one or more other components of system 200 (for example where the storage bus is coupled to interconnect 204 via some other logic like a bus bridge, chipset, etc.) Additionally, remote memory interface 235 may be incorporated into memory controller logic or provided on a same integrated circuit (IC) device in various embodiments (e.g., on the same circuit board device as the remote memory 240 or in the same enclosure as the remote memory 240).

As shown in FIG. 11, features or aspects of the circuitry 260 and circuitry 270 may be distributed throughout the system 200, and/or co-located/integrated with various components of the system 200. Any aspect of the system 200 that may require or benefit from cached/tiered storage rollback technology may include the circuitry 260 and/or the circuitry 270. In some embodiments, a multi-tier memory may include memory tiers from any of the cloud 229, the memory 214, the storage device 230, and/or the remote memory 240 (e.g., or one or more of each of these different types of memory). For example, the memory 214, the memory controller 220, the storage controller 225, the storage device 230, the remote memory interface 235, the remote memory 240, cloud devices, and/or the network interface 228 may each include circuitry 260, while the processor(s) 202 or the system 200 may include the circuitry 270, which may be in the same enclosure as the system 200 and/or fully integrated on a printed circuit board (PCB) of the system 200. For example, the circuitry 270 may be configured to implement the rollback controller aspects of the various embodiments, while the circuitry 260 may be configured to implement the cache controller aspects of the various embodiments.

Advantageously, the circuitry 260 and the circuitry 270 may include technology to implement one or more aspects of the system 10 (FIG. 1), the apparatus 20 (FIG. 2), the apparatus 30 (FIG. 3), the method 40 (FIG. 4), the method 50 (FIG. 5), the system 60 (FIG. 6), the system 70 (FIG. 7), the pseudo-code 80 (FIG. 8), the pseudo-code 90 (FIG. 9), the system 100 (FIG. 10), and/or any of the cache/tiered storage rollback features discussed herein. The system 200 may include further circuitry 260, 270 and located outside of the foregoing components.

In some embodiments, a multi-level memory may include a first memory level from the memory 214 (e.g., front-end media) and a second memory level from the storage device 230 and/or the remote memory 240 (e.g., back-end media). For example, the circuitry 260 may be configured to track transactions that access the multi-level memory and to control access to at least the front-end media. For example, the circuitry 270 may be configured to control a roll back of the multi-level memory. For example, the circuitry 260 may be configured to enforce an insertion and eviction policy for the front-end media that is a write ordered FIFO policy with no write combinations. In some embodiments, the circuitry 260 may be further configured to track an order and time of writes that are inserted in the front-end media. For example, the circuitry 260 may be configured to update a state of insertions in a lookup table based on the tracked order and time, in response to a request to roll back the front-end media.

In some embodiments, the circuitry 270 may be further configured to determine a first number of sectors to rollback for the front-end media in response to a request to roll back the multi-level memory, and determine a second number of sectors to rollback for the back-end media in response to the request to roll back the multi-level memory (e.g., where the second number is different from the first number). For example, the circuitry 270 may be configured to issue a first rollback command to the circuitry 260 that indicates the first number of sectors to roll back the front-end media, and issue a second rollback command to the circuitry 260 that indicates the second number of sectors to roll back the back-end media.

Additionally, or alternatively, the circuitry 270 may be further configured to determine an amount of time for rollback of each level of the multi-level memory in response to a request to roll back the multi-level memory. For example, the circuitry 270 may be configured to issue respective roll back commands to the circuitry 260 for each level of the multi-level memory that indicate the amount of time to roll back each level of the multi-level memory.

ADDITIONAL NOTES AND EXAMPLES

Example 1 includes an electronic apparatus, comprising one or more substrates, and circuitry coupled to the one or more substrates, the circuitry to track transactions that access a first memory level of a multi-level memory, control access to at least the first memory level of the multi-level memory, and control a roll back of at least the first memory level of the multi-level memory based on the tracked transactions.

Example 2 includes the apparatus of Example 1, wherein the circuitry is further to enforce an insertion and eviction policy for the first memory level that is a write ordered first-in-first-out policy with no write combinations.

Example 3 includes the apparatus of any of Examples 1 to 2, wherein the circuitry is further to track an order and time of writes that are inserted in the first memory level.

Example 4 includes the apparatus of Example 3, wherein the circuitry is further to update a state of insertions in a lookup table based on the tracked order and time, in response to a request to roll back the first memory level.

Example 5 includes the apparatus of any of Examples 3 to 4, wherein the circuitry is further to maintain a queue of time information for writes inserted in the first memory level.

Example 6 includes the apparatus of Example 5, wherein an entry in the queue indicates an address of the write insertion, a size of the write insertion, and a timestamp of the write insertion.

Example 7 includes the apparatus of any of Examples 1 to 6, wherein the first memory level comprises a front-end media device and wherein the multi-level memory further comprises a second level back-end media device.

Example 8 includes an electronic apparatus, comprising one or more substrates, and circuitry coupled to the one or more substrates, the circuitry to control a roll back of a multi-level memory in response to a request to roll back the multi-level memory.

Example 9 includes the apparatus of Example 8, wherein the circuitry is further to determine respective numbers of sectors to roll back for each level of the multi-level memory in response to the request to roll back the multi-level memory.

Example 10 includes the apparatus of Example 9, wherein the circuitry is further to determine a first number of sectors to roll back a first memory level of the multi-level memory, and determine a second number of sectors to roll back a second memory level of the multi-level memory based on a number of sectors indicated in the request to roll back the multi-level memory reduced by the determined first number of sectors.

Example 11 includes the apparatus of any of Examples 9 to 10, wherein the circuitry is further to issue respective rollback commands that indicate the respective determined numbers of sectors to rollback each level of the multi-level memory.

Example 12 includes the apparatus of any of Examples 8 to 11, wherein the circuitry is further to determine an amount of time for rollback of each level of the multi-level memory in response to a request to roll back the multi-level memory.

Example 13 includes the apparatus of Example 12, wherein the circuitry is further to issue respective roll back commands that indicate the amount of time to roll back each level of the multi-level memory.

Example 14 includes the apparatus of any of Examples 8 to 13, wherein the multi-level memory comprises a first level front-end media device and a second level back-end media device.

Example 15 includes an electronic system, comprising a multi-level memory that includes at least a front-end media device and a back-end media device, first circuitry communicatively coupled to the multi-level memory to track transactions that access the multi-level memory and to control access to at least the front-end media device, and second circuitry communicatively coupled to the first circuitry to control a roll back of the multi-level memory.

Example 16 includes the system of Example 15, wherein the first circuitry is further to enforce an insertion and eviction policy for the front-end media device that is a write ordered first-in-first-out policy with no write combinations.

Example 17 includes the system of any of Examples 15 to 16, wherein the first circuitry is further to track an order and time of writes that are inserted in the front-end media device.

Example 18 includes the system of Example 17, wherein the first circuitry is further to update a state of insertions in a lookup table based on the tracked order and time, in response to a request to roll back the front-end media device.

Example 19 includes the system of any of Examples 15 to 18, wherein the second circuitry is further to determine a first number of sectors to rollback for the front-end media device in response to a request to roll back the multi-level memory, and determine a second number of sectors to rollback for the back-end media device in response to the request to roll back the multi-level memory.

Example 20 includes the system of Example 19, wherein the second circuitry is further to issue a first rollback command to the first circuitry that indicates the first number of sectors to roll back the front-end media device, and issue a second rollback command to the first circuitry that indicates the second number of sectors to roll back the back-end media device.

Example 21 includes the system of any of Examples 15 to 20, wherein the second circuitry is further to determine an amount of time for rollback of each level of the multi-level memory in response to a request to roll back the multi-level memory.

Example 22 includes the system of Example 21, wherein the second circuitry is further to issue respective roll back commands to the first circuitry for each level of the multi-level memory that indicate the amount of time to roll back each level of the multi-level memory.

Example 23 includes a method, comprising tracking transactions that access a first memory level of a multi-level memory, controlling access to at least the first memory level of the multi-level memory, and controlling a roll back of at least the first memory level of the multi-level memory based on the tracked transactions.

Example 24 includes the method of Example 23, further comprising enforcing an insertion and eviction policy for the first memory level that is a write ordered first-in-first-out policy with no write combinations.

Example 25 includes the method of any of Examples 23 to 24, further comprising tracking an order and time of writes that are inserted in the first memory level.

Example 26 includes the method of Example 25, further comprising updating a state of insertions in a lookup table based on the tracked order and time, in response to a request to roll back the first memory level.

Example 27 includes the method of any of Examples 25 to 26, further comprising maintaining a queue of time information for writes inserted in the first memory level.

Example 28 includes the method of Example 27, wherein an entry in the queue indicates an address of the write insertion, a size of the write insertion, and a timestamp of the write insertion.

Example 29 includes the method of any of Examples 23 to 28, wherein the first memory level comprises a front-end media device and wherein the multi-level memory further comprises a second level back-end media device.

Example 30 includes a method, comprising receiving a request to roll back a multi-level memory, and controlling the roll back of the multi-level memory in response to the request to roll back the multi-level memory.

Example 31 includes the method of Example 30, further comprising determining respective numbers of sectors to roll back for each level of the multi-level memory in response to the request to roll back the multi-level memory.

Example 32 includes the method of Example 31, further comprising determining a first number of sectors to roll back a first memory level of the multi-level memory, and determining a second number of sectors to roll back a second memory level of the multi-level memory based on a number of sectors indicated in the request to roll back the multi-level memory reduced by the determined first number of sectors.

Example 33 includes the method of any of Examples 31 to 32, further comprising issuing respective rollback commands that indicate the respective determined numbers of sectors to rollback each level of the multi-level memory.

Example 34 includes the method of any of Examples 30 to 33, further comprising determining an amount of time for rollback of each level of the multi-level memory in response to a request to roll back the multi-level memory.

Example 35 includes the method of Example 34, further comprising issuing respective roll back commands that indicate the amount of time to roll back each level of the multi-level memory.

Example 36 includes the method of any of Examples 30 to 35, wherein the multi-level memory comprises a first level front-end media device and a second level back-end media device.

Example 37 includes at least one non-transitory machine readable medium comprising a plurality of instructions that, in response to being executed on a computing device, cause the computing device to track transactions that access a first memory level of a multi-level memory, control access to at least the first memory level of the multi-level memory, and control a roll back of at least the first memory level of the multi-level memory based on the tracked transactions.

Example 38 includes the at least one non-transitory machine readable medium of Example 37, comprising a plurality of further instructions that, in response to being executed on the computing device, cause the computing device to enforce an insertion and eviction policy for the first memory level that is a write ordered first-in-first-out policy with no write combinations.

Example 39 includes the at least one non-transitory machine readable medium of any of Examples 37 to 38, comprising a plurality of further instructions that, in response to being executed on the computing device, cause the computing device to track an order and time of writes that are inserted in the first memory level.

Example 40 includes the at least one non-transitory machine readable medium of Example 39, comprising a plurality of further instructions that, in response to being executed on the computing device, cause the computing device to update a state of insertions in a lookup table based on the tracked order and time, in response to a request to roll back the first memory level.

Example 41 includes the at least one non-transitory machine readable medium of any of Examples 39 to 40, comprising a plurality of further instructions that, in response to being executed on the computing device, cause the computing device to maintain a queue of time information for writes inserted in the first memory level.

Example 42 includes the at least one non-transitory machine readable medium of Example 41, wherein an entry in the queue indicates an address of the write insertion, a size of the write insertion, and a timestamp of the write insertion.

Example 43 includes the at least one non-transitory machine readable medium of any of Examples 37 to 42, wherein the first memory level comprises a front-end media device and wherein the multi-level memory further comprises a second level back-end media device.

Example 44 includes at least one non-transitory machine readable medium comprising a plurality of instructions that, in response to being executed on a computing device, cause the computing device to receive a request to roll back a multi-level memory, and control the roll back of the multi-level memory in response to the request to roll back the multi-level memory.

Example 45 includes the at least one non-transitory machine readable medium of Example 44, comprising a plurality of further instructions that, in response to being executed on the computing device, cause the computing device to determine respective numbers of sectors to roll back for each level of the multi-level memory in response to the request to roll back the multi-level memory.

Example 46 includes the at least one non-transitory machine readable medium of Example 45, comprising a plurality of further instructions that, in response to being executed on the computing device, cause the computing device to determine a first number of sectors to roll back a first memory level of the multi-level memory, and determine a second number of sectors to roll back a second memory level of the multi-level memory based on a number of sectors indicated in the request to roll back the multi-level memory reduced by the determined first number of sectors.

Example 47 includes the at least one non-transitory machine readable medium of any of Examples 45 to 46, comprising a plurality of further instructions that, in response to being executed on the computing device, cause the computing device to issue respective rollback commands that indicate the respective determined numbers of sectors to rollback each level of the multi-level memory.

Example 48 includes the at least one non-transitory machine readable medium of any of Examples 44 to 47, comprising a plurality of further instructions that, in response to being executed on the computing device, cause the computing device to determine an amount of time for rollback of each level of the multi-level memory in response to a request to roll back the multi-level memory.

Example 49 includes the at least one non-transitory machine readable medium of Example 48, comprising a plurality of further instructions that, in response to being executed on the computing device, cause the computing device to issue respective roll back commands that indicate the amount of time to roll back each level of the multi-level memory.

Example 50 includes the at least one non-transitory machine readable medium of any of Examples 44 to 49, wherein the multi-level memory comprises a first level front-end media device and a second level back-end media device.

Example 51 includes an apparatus, comprising means for tracking transactions that access a first memory level of a multi-level memory, means for controlling access to at least the first memory level of the multi-level memory, and means for controlling a roll back of at least the first memory level of the multi-level memory based on the tracked transactions.

Example 52 includes the apparatus of Example 51, further comprising means for enforcing an insertion and eviction policy for the first memory level that is a write ordered first-in-first-out policy with no write combinations.

Example 53 includes the apparatus of any of Examples 51 to 52, further comprising means for tracking an order and time of writes that are inserted in the first memory level.

Example 54 includes the apparatus of Example 53, further comprising means for updating a state of insertions in a lookup table based on the tracked order and time, in response to a request to roll back the first memory level.

Example 55 includes the apparatus of any of Examples 53 to 54, further comprising means for maintaining a queue of time information for writes inserted in the first memory level.

Example 56 includes the apparatus of Example 55, wherein an entry in the queue indicates an address of the write insertion, a size of the write insertion, and a timestamp of the write insertion.

Example 57 includes the apparatus of any of Examples 51 to 56, wherein the first memory level comprises a front-end media device and wherein the multi-level memory further comprises a second level back-end media device.

Example 58 includes an apparatus, comprising means for receiving a request to roll back a multi-level memory, and means for controlling the roll back of the multi-level memory in response to the request to roll back the multi-level memory.

Example 59 includes the apparatus of Example 58, further comprising means for determining respective numbers of sectors to roll back for each level of the multi-level memory in response to the request to roll back the multi-level memory.

Example 60 includes the apparatus of Example 59, further comprising means for determining a first number of sectors to roll back a first memory level of the multi-level memory, and means for determining a second number of sectors to roll back a second memory level of the multi-level memory based on a number of sectors indicated in the request to roll back the multi-level memory reduced by the determined first number of sectors.

Example 61 includes the apparatus of any of Examples 59 to 60, further comprising means for issuing respective rollback commands that indicate the respective determined numbers of sectors to rollback each level of the multi-level memory.

Example 62 includes the apparatus of any of Examples 58 to 61, further comprising means for determining an amount of time for rollback of each level of the multi-level memory in response to a request to roll back the multi-level memory.

Example 63 includes the apparatus of Example 62, further comprising means for issuing respective roll back commands that indicate the amount of time to roll back each level of the multi-level memory.

Example 64 includes the apparatus of any of Examples 58 to 63, wherein the multi-level memory comprises a first level front-end media device and a second level back-end media device.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An electronic apparatus, comprising:
   one or more substrates; and
   circuitry coupled to the one or more substrates, the circuitry to:
   track transactions that access a first memory level of a multi-level memory,
   control access to at least the first memory level of the multi-level memory,
   control a roll back of at least the first memory level of the multi-level memory based on the tracked transactions,
   track an order and time of writes that are inserted in the first memory level, and
   update a state of insertions in a lookup table based on the tracked order and time,
   in response to a request to roll back the first memory level.

2. The apparatus of claim 1, wherein the circuitry is further to:
   maintain a queue of time information for writes inserted in the first memory level.

3. The apparatus of claim 2, wherein an entry in the queue indicates an address of the write insertion, a size of the write insertion, and a timestamp of the write insertion.

4. An electronic apparatus, comprising:
   one or more substrates; and
   circuitry coupled to the one or more substrates, the circuitry to:
   control a roll back of a multi-level memory in response to a request to roll back the multi-level memory;

determine respective numbers of sectors to roll back for each level of the multi-level memory in response to the request to roll back the multi-level memory; and issue respective rollback commands that indicate the respective determined numbers of sectors to rollback each level of the multi-level memory.

5. The apparatus of claim 4, wherein the circuitry is further to:

determine a first number of sectors to roll back a first memory level of the multi-level memory; and determine a second number of sectors to roll back a second memory level of the multi-level memory based on a number of sectors indicated in the request to roll back the multi-level memory reduced by the determined first number of sectors.

6. The apparatus of claim 4, wherein the circuitry is further to:

determine an amount of time for rollback of each level of the multi-level memory in response to a request to roll back the multi-level memory.

7. The apparatus of claim 6, wherein the circuitry is further to:

issue respective roll back commands that indicate the amount of time to roll back each level of the multi-level memory.

8. An electronic system, comprising:

a multi-level memory that includes at least a front-end media device and a back-end media device;

first circuitry communicatively coupled to the multi-level memory, the first circuitry to:
 track transactions that access the multi-level memory;
 control access to at least the front-end media device;
 track an order and time of writes that are inserted in the front-end media device; and
 update a state of insertions in a lookup table based on the tracked order and time, in response to a request to roll back the front-end media device; and second circuitry communicatively coupled to the first circuitry to control a roll back of the multi-level memory.

9. The system of claim 8, wherein the second circuitry is further to:

determine a first number of sectors to rollback for the front-end media device in response to a request to roll back the multi-level memory; and determine a second number of sectors to rollback for the back-end media device in response to the request to roll back the multi-level memory.

10. The system of claim 9, wherein the second circuitry is further to:

issue a first rollback command to the first circuitry that indicates the first number of sectors to roll back the front-end media device; and issue a second rollback command to the first circuitry that indicates the second number of sectors to roll back the back-end media device.

11. The system of claim 8, wherein the second circuitry is further to:

determine an amount of time for rollback of each level of the multi-level memory in response to a request to roll back the multi-level memory.

12. The system of claim 11, wherein the second circuitry is further to:

issue respective roll back commands to the first circuitry for each level of the multi-level memory that indicate the amount of time to roll back each level of the multi-level memory.

* * * * *